(12) United States Patent
Lin et al.

(10) Patent No.: US 7,633,588 B2
(45) Date of Patent: Dec. 15, 2009

(54) FRINGE FIELD SWITCHING LCD HAVING SMECTIC LIQUID CRYSTAL AND UTILIZING ALTERNATE CURRENT SQUARED WAVE DRIVING VOLTAGE

(75) Inventors: Tzu-Yuan Lin, Taipei (TW); Ren-Hung Huang, Banciao (TW); Po-Chang Wu, Jiading Township, Kaohsiung County (TW); Shwu-Yun Tsay, Taipei (TW); Shune-Long Wu, Taipei (TW); Chia-Hsing Sun, Taipei (TW); Jin-Jei Wu, Taipei (TW); Po-Lun Chen, Chiayi (TW); Ai-Sen Liu, Hsinchu (TW)

(73) Assignee: Au Optronics Corp., Hsin-Chu (TW)

( * ) Notice: Subject to any disclaimer, the term of this patent is extended or adjusted under 35 U.S.C. 154(b) by 478 days.

(21) Appl. No.: 11/210,854

(22) Filed: Aug. 25, 2005

(65) Prior Publication Data
US 2006/0244887 A1    Nov. 2, 2006

(30) Foreign Application Priority Data
Apr. 29, 2005    (TW) ............................. 94113952 A (51) Int. Cl.
*G02F 1/1343*    (2006.01)
*G09G 3/36*    (2006.01)

(52) U.S. Cl. ........................... 349/141; 349/37
(58) Field of Classification Search ............ 349/141
See application file for complete search history.

(56) References Cited

U.S. PATENT DOCUMENTS

| | | | |
|---|---|---|---|
| 6,049,366 A * | 4/2000 | Hakemi et al. | 349/86 |
| 6,335,462 B1 | 1/2002 | Etzbach et al. | |
| 6,369,789 B1 * | 4/2002 | Ulrich et al. | 345/97 |
| 6,392,735 B1 | 5/2002 | Tani | |
| 6,404,474 B1 | 6/2002 | Watanabe et al. | |
| 6,490,022 B1 | 12/2002 | Hoshino | |
| 6,583,840 B1 | 6/2003 | Inoue et al. | |
| 6,603,528 B1 | 8/2003 | Tanaka et al. | |

(Continued)

FOREIGN PATENT DOCUMENTS

CN    1128566 A    8/1996

(Continued)

*Primary Examiner*—David Nelms
*Assistant Examiner*—Lauren Nguyen
(74) *Attorney, Agent, or Firm*—Rabin & Berdo, P.C.

(57) ABSTRACT

An LCD panel including a first substrate, a second substrate and a smectic liquid crystal layer is disclosed. The first substrate includes a first electrode, a second electrode and a first horizontal alignment film. The first electrode has plural first portions. The second electrode has plural second portions. The first portions are spaced by the second portions. The electrical field directions formed between the first portions and the second portions are perpendicular to the surface of the first substrate. The electrical field direction on each first portion is opposite to that on each second portion. The first horizontal alignment film covers the first and the second electrodes. The second substrate includes a second horizontal alignment film. The horizontal rubbing direction of the first horizontal alignment film is parallel to that of the second horizontal alignment film. The smectic liquid crystal layer is sealed between the first and the second substrates.

15 Claims, 4 Drawing Sheets

U.S. PATENT DOCUMENTS

| | | |
|---|---|---|
| 6,614,491 B2 | 9/2003 | Hasegawa et al. |
| 6,657,686 B2 | 12/2003 | Choi |
| 6,678,034 B2 | 1/2004 | Choi et al. |
| 2003/0058213 A1* | 3/2003 | Okada .......................... 345/96 |
| 2004/0196243 A1* | 10/2004 | Masutani et al. ............... 345/96 |
| 2006/0083868 A1* | 4/2006 | Sawatari et al. .............. 428/1.3 |

FOREIGN PATENT DOCUMENTS

| | | |
|---|---|---|
| CN | 1245484 A | 2/2000 |
| CN | 1246639 A | 3/2000 |
| CN | 1293770 A | 5/2001 |
| CN | 1415999 A | 5/2003 |
| JP | 09-061837 | 3/1997 |
| JP | 09-061838 | 3/1997 |
| JP | 09-258233 | 10/1997 |
| JP | 10-311972 | 11/1998 |
| JP | 2921577 | 4/1999 |
| JP | 2002-080850 | 3/2002 |
| TW | 172801 | 6/1979 |
| TW | 199923 | 4/1980 |
| TW | 294790 | 12/1982 |
| TW | 373160 | 2/1987 |
| TW | 354383 | 3/1993 |
| TW | 245780 | 4/1995 |

* cited by examiner

FRINGE FIELD SWITCHING LCD HAVING SMECTIC LIQUID CRYSTAL AND UTILIZING ALTERNATE CURRENT SQUARED WAVE DRIVING VOLTAGE

This application claims the benefit of Taiwan Application Serial No. 94113952, filed on Apr. 29, 2005, the subject matter of which is incorporated herein by reference.

BACKGROUND OF THE INVENTION

1. Field of the Invention

The invention relates in general to an LCD panel, and more particularly to a smectic liquid crystal layer capable of turning horizontally to form an LCD panel with multiple domains according to the opposite but perpendicular electrical field directions between adjacent electrodes.

2. Description of the Related Art

In a conventional ferroelectric liquid crystal (FLC) monitor, the alignment of the smectic liquid crystal layer is achieved through the rubbing method, causing the liquid crystal molecule of the smectic liquid crystal layer to have the zigzag wall alignment defect easily. Consequently, the FLC monitor would have light leakage due to the zigzag wall alignment defect, decreasing the contrast of the FLC monitor.

Furthermore, the alignment defect generated in the liquid crystal molecule of the smectic liquid crystal layer is not self-repairing. An ordinary user would not be able to eliminate the alignment defect occurring to the liquid crystal molecule due to the mechanical deformation of the FLC monitor, largely affecting the acceptability of FLC monitor by the user.

Besides, the thickness of the smectic liquid crystal layer of a conventional FLC monitor is approximately equal to 2 µm. Therefore, the design of the cell gap between the top and the bottom substrates and the embossing design on the surface of the substrate are tougher and the manufacturing process is more difficult accordingly.

Moreover, conventional FLC monitor uses the photoelectrically bistable behavior of the liquid crystal molecule of the smectic liquid crystal layer to display. There are three grey level display methods, namely, the pixel area dividing method, the frame time dividing method, and the driving voltage dividing method. The disadvantage for pixel area dividing method is that the more sub-pixels are divided, the lower the yield rate. The disadvantage for frame time dividing method is that a high speed driving circuit is required when dividing the grey level. The disadvantage for driving voltage dividing method is that since the display having optical and electrical bistable characteristics is driven according to the volume of the voltage, both voltage squared wave and the driving circuit become very complicated.

SUMMARY OF THE INVENTION

The invention provides an LCD panel whose design of having a polymer network be disposed inside the smectic liquid crystal layer can adjust the liquid crystal molecule of the smectic liquid crystal layer to achieve a smooth array and alignment and prevent the liquid crystal molecule of the smectic liquid crystal layer from the zigzag wall alignment defect, lest light leakage might occur to the LCD monitor due to the zigzag wall alignment defect, largely improving the contrast of the LCD monitor. Furthermore, the LCD panel of the invention, by inter-spacing the positive and the negative electrodes on the same substrate, simultaneously generates the positive and the negative electrical fields perpendicular to the substrate surface, achieving the function of multiple domains and horizontal rotation. Besides, the LCD panel of the invention whose design of controlling the penetration rate of LCD monitor according to the height or width of the driving alternate current (AC) squared wave can be fit into the manufacturing technology of LCD monitors without using any conventional grey level display methods such as the pixel area dividing method, the frame time dividing method or the driving voltage dividing method. Therefore, the problems associated with the application of conventional grey level display methods such as the pixel area dividing method, the frame time dividing method or the driving voltage dividing method can be avoided.

According to an object of the invention, an LCD panel includes a first substrate, a second substrate and a smectic liquid crystal layer is provided. The first substrate includes a first base, an active matrix pixel array, a TFT, a first electrode, a second electrode, and a first horizontal alignment film. The active matrix pixel array disposed on the first base includes a pixel. The pixel is defined by a first scan line and a second scan line adjacent to each other and a first data line and a second data line adjacent to each other, the two adjacent scan lines and the two adjacent data lines are inter-spaced with each other to be disposed on the first substrate. The TFT, the first electrode and the second electrode are disposed inside the pixel. The TFT is electrically connected to the first scan line, the first data line and the first electrode. The first electrode has a number of first portions. The second electrode has a number of second portions. The second portions are inter-spaced with the first portions. The electrical field directions formed between the first portions and the second electrodes are perpendicular to the surface of the first base. The electrical field direction on each first portion is opposite to that on each second portion. The first horizontal alignment film is disposed on the first base, and covers the first electrode and the second electrode. The second substrate includes a second base and a second horizontal alignment film. The second horizontal alignment film is disposed on the second base. The horizontal rubbing direction of the second horizontal alignment film is parallel to the horizontal rubbing direction of the first horizontal alignment film. The smectic liquid crystal layer, sealed between the first substrate and the second substrate, is positioned between the first horizontal alignment film and the second horizontal alignment film.

According to another object of the invention, an LCD panel including a first substrate, a second substrate, a smectic liquid crystal layer and a polymer network is provided. The first substrate includes a first base, an active matrix pixel array, a TFT, a first electrode, a second electrode, and a first horizontal alignment film. The active matrix pixel array, disposed on the first base, includes a pixel. The pixel is defined by a first scan line and a second scan line adjacent to each other as well as a first data line and a second data line adjacent to each other. The scan lines and the data lines respectively are inter-spaced to be disposed on the first substrate. The TFT, the first electrode and the second electrode are disposed inside the pixel. The TFT is electrically connected to the first scan line, the first data line and the first electrode. The first electrode has a number of first portions. The second electrode has a number of second portions. The second portions are inter-spaced with the first portions. The electrical field directions formed between the first portions and the second electrodes are perpendicular to the surface of the first base. The electrical field direction on each first portion is opposite to that on each second portion. The first horizontal alignment film is disposed on the first base, and covers the first electrode and the second electrode. The second substrate includes a second base and a second horizontal alignment film. The second horizontal alignment film is disposed on the second base. The horizontal rubbing direction of the second horizontal alignment film is parallel to the horizontal rubbing direction of the first horizontal alignment film. The smectic liquid crystal layer, sealed between the first substrate and the second substrate, is positioned between the first horizontal alignment film and the second horizontal alignment film. The polymer network is disposed inside the smectic liquid crystal layer.

According to yet another object of the invention, an LCD monitor including a backlight module, a first polarizer, an LCD panel and a second polarizer is provided. The first polarizer is disposed on the backlight module. The LCD panel includes a first substrate, a second substrate, a smectic liquid crystal layer and a polymer network. The first substrate includes a first base, an active matrix pixel array, a TFT, a first electrode, a second electrode, and a first horizontal alignment film. The active matrix pixel array is disposed on the first base and includes a pixel. The pixel is defined by a first scan line and a second scan line adjacent to each other and a first data line and a second data line adjacent to each other. The scan lines and the data lines respectively are inter-spaced to be disposed on the first substrate. The TFT, the first electrode and the second electrode are disposed inside the pixel. The TFT is electrically connected to the first scan line, the first data line and the first electrode. The first electrode has a number of first portions. The second electrode has a number of second portions. The second portions are inter-spaced with the first portions. The electrical field directions formed between the first portions and the second electrodes are perpendicular to the surface of the first base. The electrical field direction on each first portion is opposite to that on each second portion. The first horizontal alignment film is disposed on the first base, and covers the first electrode and the second electrode. The second substrate includes a second base and a second horizontal alignment film. The second horizontal alignment film is disposed on the second base. The horizontal rubbing direction of the second horizontal alignment film is parallel to the horizontal rubbing direction of the first horizontal alignment film. The smectic liquid crystal layer, sealed between the first substrate and the second substrate, is positioned between the first horizontal alignment film and the second horizontal alignment film. The polymer network is disposed inside the smectic liquid crystal layer. The second polarizer is disposed on the LCD panel. The light penetration axis of the second polarizer is perpendicular to that of the first polarizer.

Furthermore, the above-disclosed smectic liquid crystal layer includes a ferroelectric liquid crystal (FLC) or an anti-ferroelectric liquid crystal (AFLC). Besides, the above polymer network is obtained by projecting the ultra violet (UV) ray onto a number of monomers mixed inside the smectic liquid crystal layer. Furthermore, the above-disclosed first substrate further includes a first connecting portion and a second connecting portion. The first connecting portion and the second connecting portion are disposed inside the pixel. The first connecting portion is electrically connected to the first portions. The second connecting portion is electrically connected to the second portions.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
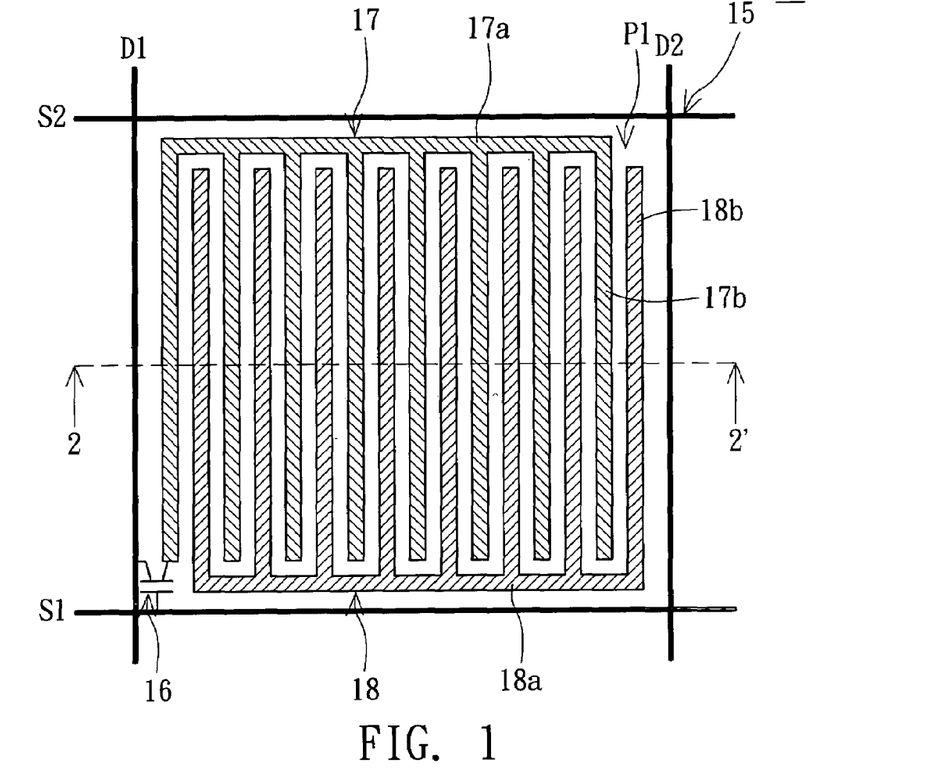
FIG. 1 is a top view of the circuit structure of an LCD panel according to a first embodiment of the invention.
Figure 2:
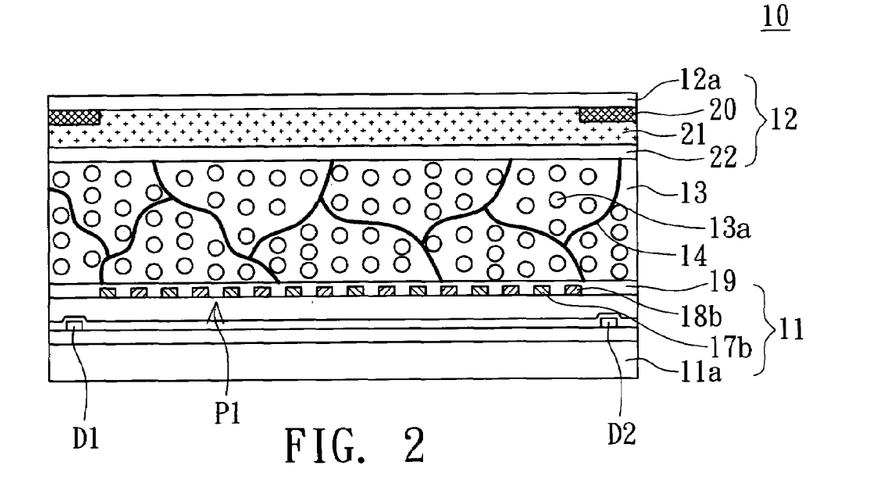
FIG. 2 is an enlarged view of a partial cross-sectional structure of the LCD panel viewed along the cross-sectional line 2-2' of FIG. 1.

Referring to both FIGS. 1~2, FIG. 1 is a top view of the circuit structure of an LCD panel according to a first embodiment of the invention, while FIG. 2 is an enlarged view of a partial cross-sectional structure of the LCD panel viewed along the cross-sectional line 2-2' of FIG. 1. In FIGS. 1~2, the LCD panel 10 includes a first substrate 11, a second substrate 12, a smectic liquid crystal layer 13 and a polymer network 14.

the first substrate 11 includes a first base 11a, an active matrix pixel array 15, at least a control switch, a first electrode 17, a second electrode 18 and a first horizontal alignment film 19. The active matrix pixel array 15 is disposed on the first base 11a and includes a number of pixels. Each pixel is defined by two adjacent scan lines or gate lines and two adjacent data lines or source lines. The two adjacent scan lines or gate lines and the two adjacent data lines or source lines are inter-spaced to be disposed on the first base 11a. In the present embodiment, the active matrix pixel array 15 is exemplified by a pixel P1. The pixel P1 is defined by a first scan line S1 and a second scan line S2 adjacent to each other as well as a first data line D1 and a second data line D2 adjacent to each other. The control switch, such as a transistor or a thin film transistor (TFT) 16, is positioned on the first base 11a to be disposed in pixel P1. Furthermore, the TFT 16 is electrically connected to the first scan line S1 and the first data line D1.

The first electrode 17 positioned on the first base 11a to be disposed in pixel P1 is electrically connected to TFT 16. The first electrode 17 has a first connecting portion 17a and a number of mutually parallel first portions 17b. The first connecting portion 17a is electrically connected to the first portions 17b. The second electrode 18, positioned on the first base 11a to be disposed in pixel P1, has a second connecting portion 18a and a number of mutually parallel second portions 18b. The second connecting portion 18a is electrically connected to the second portions 18b. The second portions 18b and the first portions 17b are inter-spaced. In the present embodiment, the first electrode 17 and the second electrode 18 are inter-spaced like two combs matching together face to face. The first horizontal alignment film 19 is disposed on the first base 11a, and covers the first electrode 17 and the second electrode 18.

The second substrate 12 includes a second base 12a, a black matrix 20, a color filter 21 and a second horizontal alignment film 22. The black matrix 20 is positioned on the second base 12a to be corresponding to the active matrix pixel array 15 for the main transparent part of the pixel P1 to be exposed, that is, for the first electrode 17 and the second electrode 18 to be exposed in where the pixel P1 is distributed. The color filter 21 is disposed on the second base 12a and overlaps with the edge of the black matrix 20. The color filter 21 corresponds to the main transparent part of the pixel P1 exposed by the black matrix 20. The second horizontal alignment film 22 is disposed on the second base 12a and covers the color filter 21. The horizontal rubbing direction of the second horizontal alignment film 22 is parallel to that of the first horizontal alignment film 19. That is to say, applying a single axis of parallel and horizontal alignment to the first horizontal alignment film 19 and the second horizontal alignment film 22 enables the first substrate 11 and the second substrate 12 to be disposed according to respective horizontal rubbing direction and parallel to each other.

The smectic liquid crystal layer 13 is sealed between the first substrate 11 and the second substrate 12 and positioned between the first horizontal alignment film 19 and the second horizontal alignment film 22. The smectic liquid crystal layer 13 has a number of liquid crystal molecules 13a. The polymer network 14 is disposed inside the smectic liquid crystal layer 13 to achieve an even arrangement and alignment of the liquid crystal molecules 13a.

Figure 3:
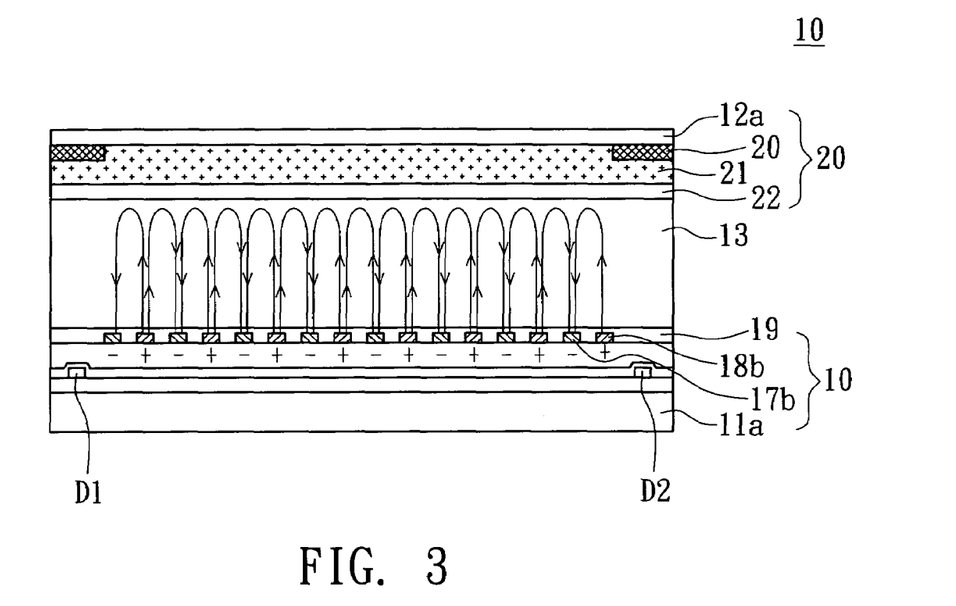
FIG. 3 is a diagram showing the distribution of the electrical fields formed when a negative voltage and a positive voltage are respectively applied to the first portions and the second portions of FIG. 2.

As shown in FIG. 3, when a voltage is applied to the first electrode 17 and the second electrode 18, for example, a negative voltage and a positive voltage are respectively applied to the first electrode 17 and the second electrode 18, all of the electrical field directions formed between the first portions 17b and the second portions 18b are perpendicular to the surface of the first base 11a because the first portions 17b and the second portions 18b are adjacent and very close to each other. The electrical field direction on each first portion 17b is opposite to that on each second portion 18b, that is, the electrical field direction on the first portions 17b is opposite to that on the second portions 18b. If a negative voltage and a positive voltage are respectively applied to the first electrode 17 and the second electrode 18, the electrical field direction on the first portions 17b extends towards the first substrate 11 from the second substrate 12, while the electrical field direction on the second portions 18a extends towards the second substrate 12 from the first substrate 11. It is noteworthy that in order to more clearly illustrate how the electrical field directions formed between the first portions 17b and the second portions 18b are perpendicular to the surface of the first base 11a and that the electrical field direction on each first portion 17b is opposite to that on each second portion 18b, the structure and labels of the liquid crystal molecule 13a and the polymer network 14 are omitted in FIG. 3. Besides, a minus sign "−" and a plus sign "+" are correspondingly marked on the bottom of the structure of the first electrode 17b and the second electrode 18b to denote that a negative voltage and a positive voltage are respectively applied to the first electrode 17 and the second electrode 18. Meanwhile, a positive voltage and a negative voltage are respectively applied to the first electrode 17 and the second electrode 18b. The electrical field direction on the first portions 17b extends towards the second substrate 12 from the first substrate 11, while the electrical field direction on the second portions 18a extends towards the first substrate 11 from the second substrate 12.

Figure 4:
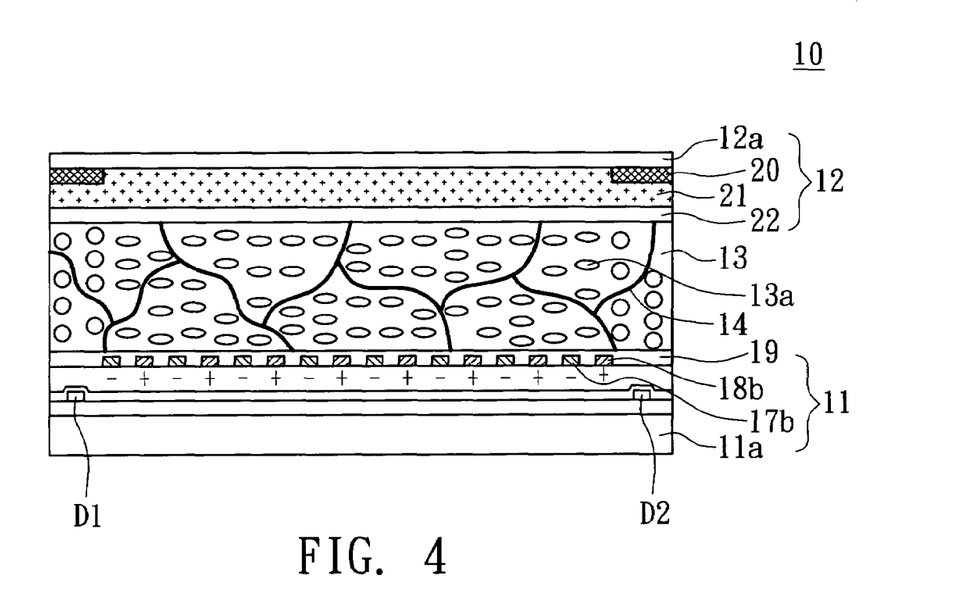
FIG. 4 is a diagram showing the liquid crystal molecule of FIG. 2 rotates horizontally according to the electrical field formed between first portions and the second portions.
Figure 5:
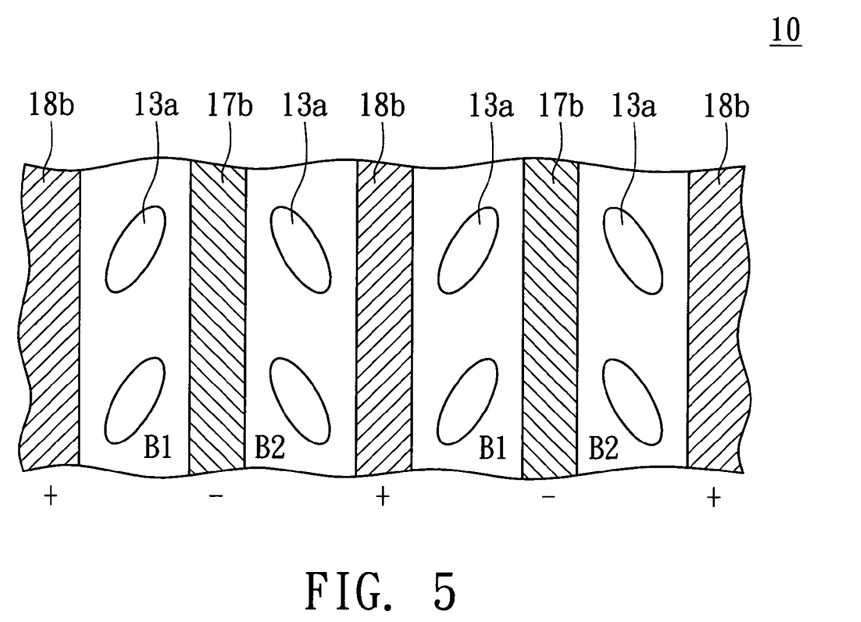
FIG. 5 is a diagram showing the multiple domains formed after the horizontal rotation of the liquid crystal molecule of FIG. 4.

As shown in FIGS. 4~5, given that the electrical field directions formed between the first portions 17b and the second portions 18b are perpendicular to the surface of the first base 11a and that the electrical field direction on each first portion 17b is opposite to that on each second portion 18b, the liquid crystal molecule 13a of the smectic liquid crystal layer 13 rotates horizontally according to the perpendicular electrical field formed between the first portions 17b and the second portions 18b so as to form multiple domains. In the present embodiment, the liquid crystal molecule 13a of the smectic liquid crystal layer 13 rotate horizontally according to the perpendicular electrical field formed between the first portions 17b and the second electrodes 18b so as to form domains B1 and B2. It is noteworthy that in order to clearly illustrate how the liquid crystal molecule 13a of the smectic liquid crystal layer 13 rotates horizontally according to the perpendicular electrical field formed between the first portions 17b and the second electrodes 18b so as to form domains B1 and B2, the structure and labels of the polymer network 14 and the first horizontal alignment film 19 are omitted in FIG. 5.

However, anyone who has relevant knowledge would understand that the technology of the present embodiment is not limited thereto. For example, the smectic liquid crystal layer 13 may include a ferroelectric liquid crystal (FLC) or an anti-ferroelectric liquid crystal (AFLC), while the liquid crystal molecule 13a may have a low spontaneous polarization value Ps (I Ps I<200 nC/cm$^2$). The first electrode 17 and the second electrode 18 may contain indium tin oxide (ITO), indium zinc oxide (IZO), cadmium tin oxide (CTO), stannum dioxide (SnO$_2$) or zinc oxide (ZnO), while the first base 11a and the second base 12a may include a glass substrate, an insulated substrate or a plastic substrate. In one embodiment, the first electrode 17 and the second electrode 18 include metal or metal alloy.

Despite that the first portions 17b and the second portions 18b are exemplified by strip-shaped electrode structure in the present embodiment, however, the first portions 17b and the second portions 18b can be an electrode structure of other shapes, a W-shaped or V-shaped electrode structure for instance, as long as electrical separation is maintained between the first electrode 17 and the second electrode 18.

In the present embodiment, the second connecting portion 18a and the second portions 18b can be disposed on different insulation layers of the first base 11a. For example, the second connecting portion 18a is disposed under the second portions 18b. Through a number of conductive via holes penetrating the insulation layer between the second connecting portion 18a and the second portions 18b, the second connecting portion 18a and the second portions 18b disposed on different layers can be electrically connected together.

Figure 6:
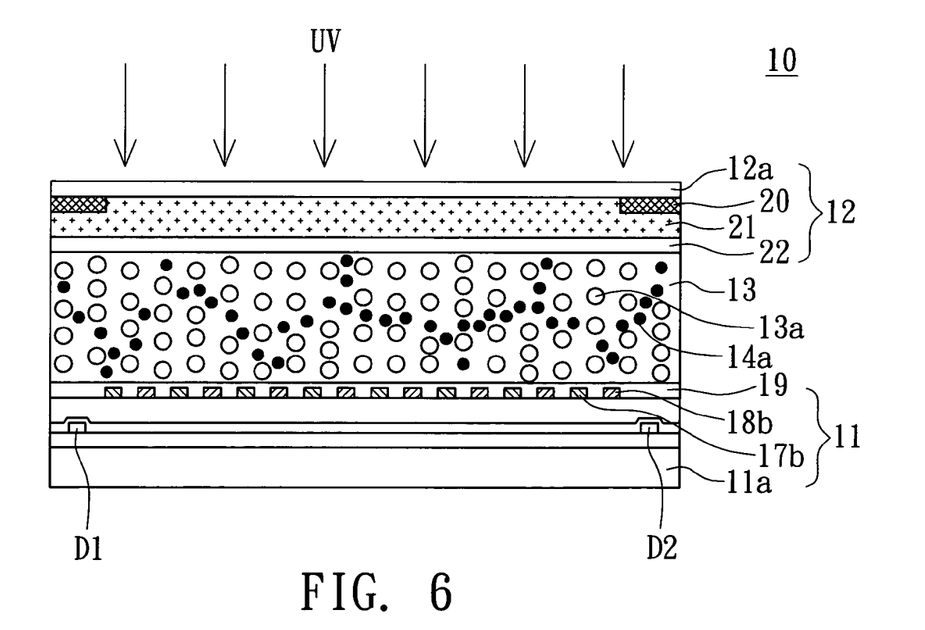
FIG. 6 is a diagram showing the state when the photosensitive monomer mixed inside the smectic liquid crystal layer is projected by the UV light.

Furthermore, as shown in FIG. 6, the polymer network 14 is mixed with a number of photosensitive monomers 14a inside the smectic liquid crystal layer 13 by irradiating the ultra violet (UV) ray. The photosensitive monomer 14a creates chemical reaction after being UV-rayed to form the abovementioned polymer network 14. Inside the smectic liquid crystal layer 13, several branch chains of the polymer network 14 are used to couple the first horizontal alignment film 19 with the second horizontal alignment film 22. Consequently, the arrangement principles of the liquid crystal molecule 13a can be maintained. The photosensitive monomers 14a amount to 0.1 wt %~20 wt % of the smectic liquid crystal layer 13. The photosensitive monomer 14a comprises benzene having hydrocarbon and fluoride, or biphenyl having hydrocarbon and fluoride. Moreover, the fluoride of the photosensitive monomer includes M fluorine atoms, where M is an integer ranging from 0 to 8. Moreover, the photosensitive monomer 14a uses a linear aliphatic hydrocarbon chain as the linking group. The chemical formula of the linear aliphatic hydrocarbon chain is expressed as $(CH_2)_n$, where n is an integer ranging from 0 to 22. The above disclosed photosensitive monomer 14a can be the monomer expressed in chemical formulae [1] and [2]:

Besides, a driving voltage whose wave pattern is an alternate current (AC) squared wave alternating among positive voltage, zero voltage and negative voltage can be applied to the first electrode 17 and the second electrode 18, so that the electrical field directions formed between the first portions 17b and the second portions 18b are perpendicular to the surface of the first base 11a, and that the electrical field direction on each first portion 17b is opposite to that on each second portion 18b. The penetration rate of the LCD panel 10 is determined by the height of the squared wave. Furthermore, the average value of the squared wave within a time interval equals zero. The time width of the above selected positive squared wave and negative squared wave are both larger than the rising time (Tr) of the liquid crystal molecule 13a in response to an external voltage, while the time width of zero voltage is smaller than the decay time (Td) of the liquid crystal molecule 13a in response to an external voltage.

Moreover, a driving voltage whose wave pattern is an alternate current (AC) squared wave alternating among positive voltage, zero voltage and negative voltage can be applied to the first electrode 17 and the second electrode 18, so that the electrical field directions formed between the first portions 17b and the second portions 18b are perpendicular to the surface of the first base 11a, and that the electrical field direction on each first portion 17b is opposite to that on each second portion 18b. The penetration rate of the LCD panel 10 is determined by the width of the squared wave. Furthermore, the average value of the squared wave within a time interval equals zero. The time width of the above selected positive squared wave and negative squared wave are both larger than the rising time (Tr) of the liquid crystal molecule 13a in response to an external voltage, while the time width of zero voltage is smaller than the decay time (Td) of liquid crystal molecule 13a in response to an external voltage.

The LCD panel disclosed in the present embodiments disposes a polymer network inside the smectic liquid crystal layer, so that the liquid crystal molecule of the smectic liquid crystal layer can be adjusted to achieve a smooth array and alignment and prevent the liquid crystal molecule of the smectic liquid crystal layer from the zigzag wall alignment defect, lest light leakage might occur to the LCD monitor due to the zigzag wall alignment defect, largely improving the contrast of the LCD monitor. Furthermore, the LCD panel of the present embodiment, by inter-spacing the positive and the negative electrodes on the same substrate, simultaneously generates the positive and the negative electrical fields perpendicular to the substrate surface, achieving the function of multiple domains and horizontal rotation. Besides, the LCD panel of the present embodiment whose design of controlling the penetration rate of LCD monitor according to the height or width of the driving alternate current (AC) squared wave can be fit into the manufacturing technology of LCD monitors without using any conventional grey level display methods such as the pixel area dividing method, the frame time dividing method or the driving voltage dividing method. Therefore, the problems associated with the application of conventional grey level display methods such as the pixel area dividing method, the frame time dividing method or the driving voltage dividing method can be avoided.

Second Embodiment

Figure 7:
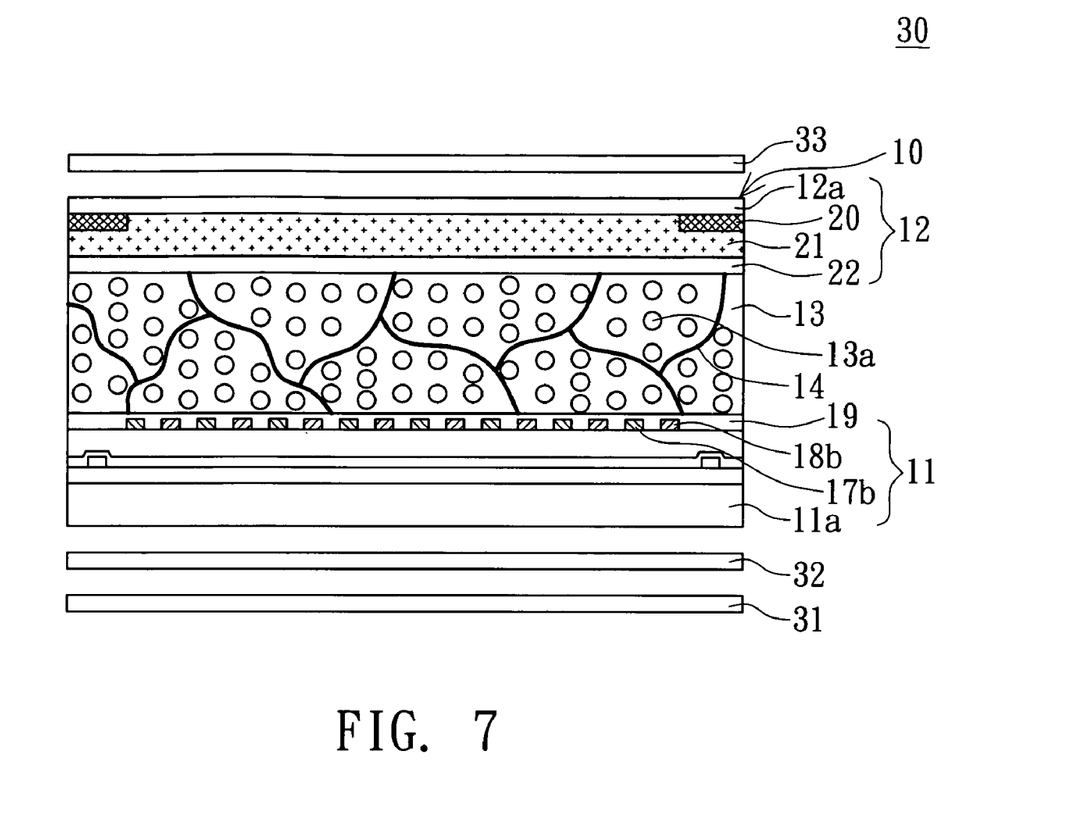
FIG. 7 is a diagram showing partial cross-sectional structure of the LCD monitor according to a second embodiment of the invention.

Referring to FIG. 7, a diagram showing partial cross-sectional structure of the LCD monitor according to a second embodiment of the invention is shown. In FIG. 7, LCD monitor 30 includes a backlight module 31, a first polarizer 32, a second polarizer 33 and an LCD panel 10 disclosed in the first embodiment. The first polarizer 32 is disposed on the backlight module 31. The LCD panel 10 is disposed on the first polarizer 32. The second polarizer 33 is disposed on the LCD panel 10. The light penetration axis of the first polarizer 32 is substantially perpendicular to that of the second polarizer 33. The first polarizer 32 and the second polarizer 33 are respectively adjacent to the first substrate 11 and the second substrate 12.

When the LCD monitor 30 displays a frame at a frequency within the time interval from 60 Hz to 1 kHz, the wave pattern of the driving voltage of the first electrode 17 and the second electrode 18 can be a squared wave alternating among positive voltage, zero voltage and negative voltage. Furthermore, the average value of the squared wave within a time interval equals zero. The time width of the above selected positive squared wave and negative squared wave are both larger than the rising time (Tr) of the liquid crystal molecule 13a in response to an external voltage. The time width of the zero voltage is smaller than the decay time (Td) of the liquid crystal molecule 13a in response to an external voltage.

However, anyone who has relevant knowledge would understand that the technology of the present embodiment is not limited thereto. For example, the backlight module 31 may include a light source having a red light, a green light and a blue light. Furthermore, the light source of the backlight module 31 may emit the red light, the green light and the blue light at the same time, or sequentially emit the red light, the green light and the blue light. Besides, the LCD monitor 30 is applicable to electronic products such as computer monitor, flat screen TV, monitor screen, mobile phone, handy gaming device, digital camera (DC), digital video (DV), digital play device, personal digital assistant (PDA), notebook or Table PC.

The LCD panel disclosed in above embodiments of the invention disposes a polymer network inside the smectic liquid crystal layer, so that the liquid crystal molecule of the smectic liquid crystal layer can be adjusted to achieve a smooth array and alignment and prevent the liquid crystal molecule of the smectic liquid crystal layer from the zigzag wall alignment defect, lest light leakage might occur to the LCD monitor due to the zigzag wall alignment defect, largely improving the contrast of the LCD monitor. Furthermore, the LCD panel of the present embodiment, by inter-spacing the positive and the negative electrodes on the same substrate, simultaneously generates the positive and the negative electrical fields perpendicular to the substrate surface, achieving the function of multiple domains and horizontal rotation. Besides, the LCD panel of the present embodiment whose design of controlling the penetration rate of LCD monitor according to the height or width of the driving alternate current (AC) squared wave can be fit into the manufacturing technology of LCD monitors without using any conventional grey level display methods such as the pixel area dividing method, the frame time dividing method or the driving voltage dividing method. Therefore, the problems associated with the application of conventional grey level display methods such as the pixel area dividing method, the frame time dividing method or the driving voltage dividing method can be avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
   a first substrate, comprising:
      a first base;
      an active matrix pixel array having a pixel disposed on the first base, wherein the pixel is defined by a first scan line, a second scan line, a first data line and a second data line disposed on the first base;
      a thin film transistor (TFT) disposed inside the pixel and electrically connected to the first scan line and the first data line;
      a first electrode having a plurality of first portions disposed inside the pixel and electrically connected to the TFT;
      a second electrode having a plurality of second portions disposed inside the pixel, wherein the second portions are inter-spaced with the first portions, and wherein a driving voltage with an alternate current squared wave alternating among a positive voltage, a zero voltage and a negative voltage is applied to the first electrode and the second electrode, so that the electrical field directions formed between the first portions and the second electrodes are perpendicular to the surface of the first base, and the electrical field direction on each of the first portions is opposite to that on each of the second portions, and the average value of the alternate current squared wave within a time interval equals zero; and
      a first horizontal alignment film disposed above the first base for covering the first electrode and the second electrode;
   a second substrate, comprising:
      a second base; and
      a second horizontal alignment film disposed above the second base, wherein the horizontal rubbing direction of the second horizontal alignment film is substantially parallel to that of the first horizontal alignment film; and
   a smectic liquid crystal layer sealed between the first substrate and the second substrate and positioned between the first horizontal alignment film and the second horizontal alignment film; wherein the smectic liquid crystal layer is selected from a group consisting of a ferroelectric liquid crystal (FLC) and an anti-ferroelectric liquid crystal (AFLC).

2. The LCD panel according to claim 1, further comprising: a polymer network disposed inside the smectic liquid crystal layer.

3. The LCD panel according to claim 2, wherein the polymer network is mixed with a plurality of photosensitive monomers inside the smectic liquid crystal layer by irradiating the ultra violet (UV) ray.

4. The LCD panel according to claim 3, wherein each of the photosensitive monomers comprises benzene having hydrocarbon and fluoride, or biphenyl having hydrocarbon and fluoride.

5. The LCD panel according to claim 4, wherein the fluoride of each of the photosensitive monomer comprises M fluorine atoms, where M is an integer ranging from 0 to 8.

6. The LCD panel according to claim 4, wherein each of the photosensitive monomer uses a linear aliphatic hydrocarbon chain as the linking group, and the chemical formula of the linear aliphatic hydrocarbon chain is expressed as $(CH_2)_n$, where n is an integer ranging from 0 to 22.

7. The LCD panel according to claim 3, wherein the photosensitive monomers amount to 0.1 wt %~20 wt % of the smectic liquid crystal layer.

8. The LCD panel according to claim 1, wherein the first substrate further comprises:
   a first connecting portion disposed inside the pixel and electrically connected to the first portions; and
   a second connecting portion disposed inside the pixel and electrically connected to the second portions.

9. A liquid crystal display (LCD) panel, comprising:
   a first substrate, comprising:
      a first base;
      an active matrix pixel array having a pixel disposed on the first base, wherein the pixel is defined by a first scan line, a second scan line, a first data line and a second data line disposed on the first substrate;
      a thin film transistor (TFT) disposed inside the pixel and electrically connected to the first scan line and the first data line;
      a first electrode having a plurality of first portions disposed inside the pixel and electrically connected to the TFT;
      a second electrode having a plurality of second portions disposed inside the pixel, wherein the second portions are inter-spaced with the first portions, and wherein a driving voltage with an alternate current squared wave alternating among a positive voltage, a zero voltage and a negative voltage is applied to the first electrode and the second electrode, so that the electrical field directions formed between the first portions and the second electrodes are perpendicular to the surface of the first base, and the electrical field direction on each of the first portions is opposite to that on each of the second portions, and the average value of the alternate current squared wave within a time interval equals zero; and
      a first horizontal alignment film disposed on the first base for covering the first electrode and the second electrode;
   a second substrate, comprising:
      a second base; and
      a second horizontal alignment film disposed on the second base, wherein the horizontal rubbing direction of the second horizontal alignment film is parallel to that of the first horizontal alignment film;
   a smectic liquid crystal layer sealed between the first substrate and the second substrate and positioned between the first horizontal alignment film and the second horizontal alignment film; wherein the smectic liquid crystal layer is selected from a group consisting of a ferroelectric liquid crystal (FLC) and an anti-ferroelectric liquid crystal (AFLC); and a polymer network disposed inside the smectic liquid crystal layer.

10. The LCD panel according to claim 9, wherein the polymer network is mixed with a plurality of photosensitive monomers inside the smectic liquid crystal layer by irradiating the ultra violet (UV) ray.

11. The LCD panel according to claim 10, wherein each of the photosensitive monomers comprises benzene having hydrocarbon and fluoride, or biphenyl having hydrocarbon and fluoride.

12. The LCD panel according to claim 11, wherein the fluoride of each of the photosensitive monomer comprises M fluorine atoms, and M is an integer ranging from 0 to 8.

13. The LCD panel according to claim 11, wherein each of the photosensitive monomers uses a linear aliphatic hydrocarbon chain as the linking group, and the chemical formula of the linear aliphatic hydrocarbon chain is expressed as $(CH_2)_n$, and n is an integer ranging from 0 to 22.

14. The LCD panel according to claim 10, wherein the photosensitive monomers amount to 0.1 wt%~20 wt% of the smectic liquid crystal layer.

15. The LCD panel according to claim 9, wherein the first substrate further comprises:
   a first connecting portion disposed inside the pixel and electrically connected to the first portions; and
   a second connecting portion disposed inside the pixel and electrically connected to the second portions.

* * * * *

UNITED STATES PATENT AND TRADEMARK OFFICE
CERTIFICATE OF CORRECTION

PATENT NO. : 7,633,588 B2
APPLICATION NO. : 11/210854
DATED : December 15, 2009
INVENTOR(S) : Lin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Ninth Day of November, 2010

David J. Kappos
*Director of the United States Patent and Trademark Office*